US009836343B2

(12) United States Patent
Zhang et al.

(10) Patent No.: US 9,836,343 B2
(45) Date of Patent: Dec. 5, 2017

(54) FRAMEWORK FOR USER-MODE CRASH REPORTING

(71) Applicant: Microsoft Technology Licensing, LLC, Redmond, WA (US)

(72) Inventors: Hongwei Zhang, Issaquah, WA (US); Aruldevi Muthukumsarasamy, Redmond, CA (US); Aswin Gunawan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 14/217,030

(22) Filed: Mar. 17, 2014

(65) Prior Publication Data

US 2015/0261596 A1    Sep. 17, 2015

(51) Int. Cl.
*G06F 11/00* (2006.01)
*G06F 11/07* (2006.01)
*G06F 11/36* (2006.01)

(52) U.S. Cl.
CPC ...... *G06F 11/0778* (2013.01); *G06F 11/0715* (2013.01); *G06F 11/366* (2013.01)

(58) Field of Classification Search
CPC ............. G06F 11/0775; G06F 11/0778; G06F 11/3636; G06F 11/0766; G06F 11/0715; G06F 11/366
See application file for complete search history.

(56) References Cited

U.S. PATENT DOCUMENTS

| 7,975,179 | B2 | 7/2011 | Chandrasekaran |
| 8,381,189 | B2 | 2/2013 | Surazski et al. |
| 8,438,546 | B2 | 5/2013 | Wolf |
| 8,479,051 | B2 | 7/2013 | Yuan et al. |
| 8,516,308 | B1 | 8/2013 | Gill et al. |
| 8,621,282 | B1 | 12/2013 | Mixter et al. |

(Continued)

FOREIGN PATENT DOCUMENTS

| WO | 2005043360 A1 | 5/2005 | |
| WO | WO 2013033816 A1 * | 3/2013 | ......... G06F 21/6209 |

OTHER PUBLICATIONS

Fuller, Landon. "Open Source Crash Reporter for IPhone (and Mac OS X).", Jan. 29, 2009, p. 1.*

(Continued)

*Primary Examiner* — Bryce Bonzo
*Assistant Examiner* — Jonathan Gibson
(74) *Attorney, Agent, or Firm* — Michael Best & Friedrich LLP

(57) ABSTRACT

A user-mode crash reporting system for generating a crash report when an application crashes is provided. The user-mode crash reporting system installs a crash handler to execute in the same process as the application when the application crashes. When the application crashes, the crash handler identifies a victim thread of the process that was executing at the time of a crash. The crash handler then walks a call stack of the victim thread to identify return addresses for returning from called functions of the application. The crash handler identifies offsets within the module corresponding to the return addresses and creates a call chain of functions using the identified offsets. The crash handler then generates a crash report based on the identified call chain.

15 Claims, 10 Drawing Sheets

(56) References Cited

U.S. PATENT DOCUMENTS

| | | | | |
|---|---|---|---|---|
| 2003/0005414 | A1* | 1/2003 | Elliott | G06F 11/0715 717/128 |
| 2005/0210077 | A1 | 9/2005 | Balakrishnan et al. | |
| 2006/0005078 | A1 | 1/2006 | Guo et al. | |
| 2006/0253837 | A1* | 11/2006 | Hudson | G06F 11/366 717/124 |
| 2007/0150871 | A1* | 6/2007 | Barsness | G06F 11/3612 717/128 |
| 2008/0301501 | A1* | 12/2008 | Grant | G06F 11/079 714/37 |
| 2011/0099550 | A1* | 4/2011 | Shafi | G06F 11/323 718/102 |
| 2012/0137182 | A1* | 5/2012 | Zhang | G06F 11/0775 714/48 |
| 2013/0080502 | A1 | 3/2013 | Mccoll et al. | |
| 2013/0152056 | A1 | 6/2013 | Chang et al. | |
| 2014/0068326 | A1* | 3/2014 | Quinn | G06F 11/0709 714/15 |

OTHER PUBLICATIONS

Silberschatz et al. "Operating System Concepts", 2002, Sixth Edition, p. 867.*

Call Stack, 2012, Wikipedia, p. 1.*

Fuller, Landon. "Open Source Crash Reporter for IPhone (and Mac OS X)", 2009, p. 1.*

Silberschatz et al., "Operating System Concepts"—Appendix B: The Mach System, 2002, Sixth Edition, p. 867.*

"Understanding and Analyzing iOS Application Crash Reports", Retrieved on: Feb. 20, 2014 Available at: https://developer.apple.com/library/ios/technotes/tn2151/_index.html.

Rocchi, Cesare, "Overview of iOS Crash Reporting Tools: Part 2/2", Published on: May 21, 2013, Available at: http://www.raywenderlich.com/34050/overview-of-ios-crash-reporting-tools-part-2.

Harris, Clint, PLCrashReporter: A Handy API for Reporting iPhone App Crashes, Published on: Feb. 7, 2009, Available at: http://www.clintharris.net/2009/plcrashreporter-a-handy-api-for-reporting-iphone-app-crashes.

Chang, Wayne, "Announcing Crashlytics for Android", Published on: May 30, 2013 Available at: http://www.crashlytics.com/blog/its-finally-here-announcing-crashlytics-for-android/.

Rocchi, Cesare, "Overview of iOS Crash Reporting Tools: Part 1/2", Published on: May 20, 2013, Available at: http://www.raywenderlich.com/33669/overview-of-ios-crash-reporting-tools-part-1.

International Search Report and Written Opinion issued in PCT Patent Application No. PCT/US2015/020053, dated Jun. 15, 2015: 14 Pages.

Dang, et al., "ReBucket: A Method for Clustering Duplicate Crash Reports Based on Cell Stack Similarity", In Proceedings of the 34th International Conference on Software Engineering, IEEE: Jun. 2, 2012, pp. 1084-1093.

Second Written Opinion issued in PCT Application No. PCT/US2015/020053, dated Feb. 5, 2016, 9 Pages.

"International Preliminary Report on Patentability Issued in PCT Application No. PCT/US2015/020053," dated Jun. 1, 2016, 11 Pages.

Azarpour, Soheil, "Demystifying iOS Application Crash Logs," Published on: Jan. 3, 2013, Available at: https://www.raywenderlich.com/23704/demystifying-ios-application-crash-logs.

* cited by examiner

FRAMEWORK FOR USER-MODE CRASH REPORTING

BACKGROUND

Although commercially available computer programs are generally very reliable, a program can encounter problems that result in a malfunction that causes the program to stop functioning. Such a malfunction is referred to as a "crash." The problems that can cause a program to crash include hardware errors (e.g., defective memory location), logical errors in the program (e.g., using an invalid memory address), incompatible components (e.g., linking to an outdated function), and so on. When a program crashes, the operating system typically takes control as a result of a hardware or software exception being raised. A hardware exception can be raised for a variety of reasons, including attempted division by zero, use of an invalid memory address, attempted execution of an invalid instruction, and so on. The instruction set architecture of the processor on which the program executes defines different types of exceptions and where control is transferred when each type of exception is raised. The program or the operating system typically installs hardware exception handlers for each type of hardware exception. A software exception, in contrast, is raised by software detecting an unusual situation. For example, a software exception might be raised when a function is passed an invalid parameter, when a C++ exception is not caught, and so on. The program or operating system typically installs software exception handlers for each type of software exception. When an exception is raised, the exception handler for that type of exception is invoked to handle the exception. Each exception handler determines, based on the seriousness of the exception, whether the program should continue its execution or terminate its execution, resulting in a crash.

When a program crashes, the operating system typically collects information about the crash, generates a crash report based on the collected information, and makes the crash report available to the developer of the program that crashed. When a crash handler installed by the operating system is invoked, the crash handler typically executes in a supervisory privilege mode (e.g., supervisor mode or kernel mode) of the processor. Because the crash handler executes in a supervisory privilege mode, the crash handler may have access to all the data structures of the operating system and the data structures of the program that crashed. The access to these data structures allows the crash handler to collect any information it deems appropriate for a crash report. Once a crash report is generated, it can be made available to the developer. For example, the crash report may be transmitted to a crash reporting server where it is made available to the developer.

Although crash reports provided by an operating system provide valuable information to assist a developer in determining the cause of the crash of a program, the information in a crash report is not typically tailored to the program itself or the needs of the developer. Moreover, a crash reporting server may provide generic tools for use by developers of all types of programs. As a result, a developer of a program may not have program-specific tools available that would be helpful in determining the cause of the crash. Also, the operating system may control what crash reports to send and the timing of the sending. A developer may want such control to meet the developer's needs.

SUMMARY

A user-mode crash reporting system for generating a crash report when an application crashes is provided. The user-mode crash reporting system installs a crash handler to execute in the same process as the application when the application crashes. When the application crashes, the crash handler identifies a victim thread of the process that was executing at the time of a crash. The crash handler then walks a call stack of the victim thread to identify return addresses for returning from called functions of the application. The crash handler identifies offsets within the loaded modules corresponding to the return addresses and creates a call chain of functions using the identified offsets. The crash handler then generates a crash report based on the identified call chain.

DETAILED DESCRIPTION

Figure 1:
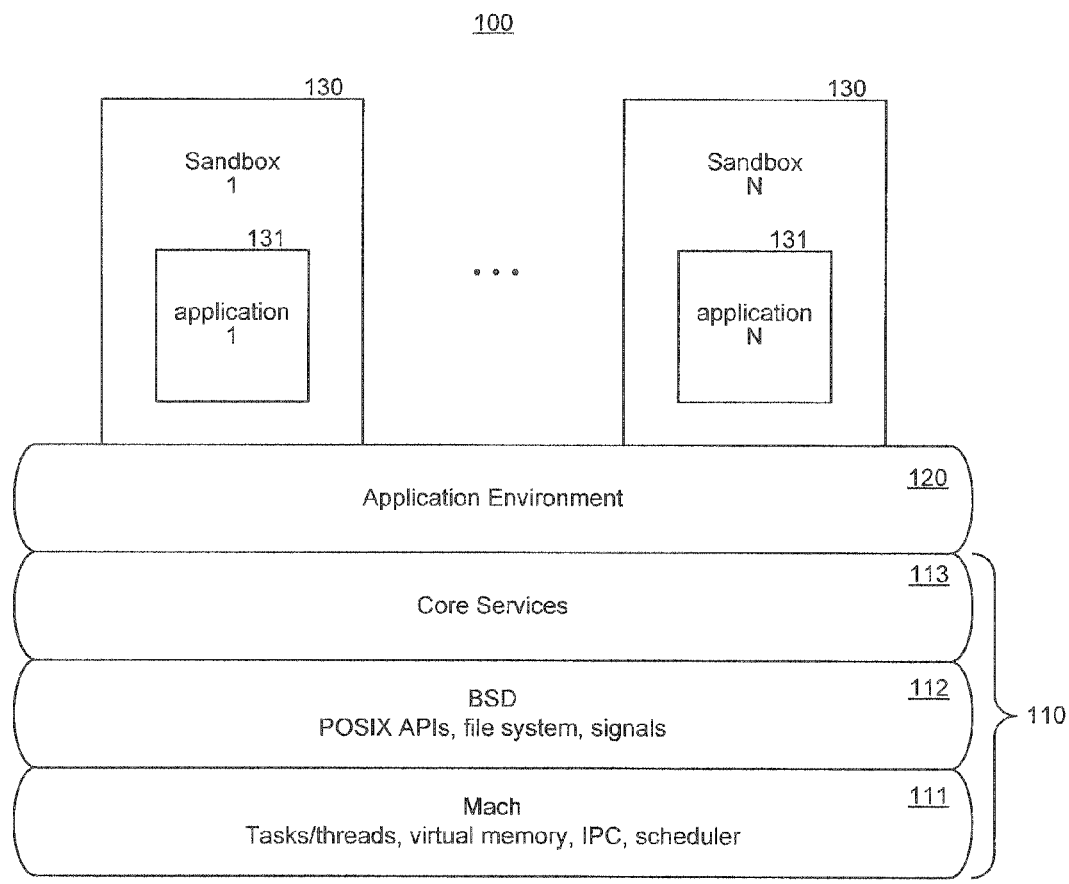
FIG. 1 is a block diagram that illustrates an execution environment in which applications execute in some embodiments.

A method and system for generating a user-mode crash report when an application crashes is provided. In some embodiments, a user-mode crash reporting system executes a crash handler in the same process (i.e., in-process) as the crashed application and generates a crash report based on information accessible to the process. The user-mode crash reporting system then controls the sending of the crash report to a crash reporting server. The user-mode crash reporting system installs a crash handler to execute in the same process in user privilege mode as the application that crashes. The user-mode crash reporting system installs crash handlers that are specific to the underlying operating system and programming environment. For example, if the operating system is Apple's iOS operating system, then crash handlers may be installed to handle Mach exceptions and BSD signals. If the programming environment is based on C++, then crash handlers may be installed to handle exceptions that are thrown, but not otherwise caught. When an application crashes, the crash handler may identify a "victim" thread of the process that was executing at the time of the crash and then generate a call chain of the functions that had been invoked (or called) at the time of the crash. To generate the call chain, the crash handler walks the call stack of the victim thread to identify return addresses for returning from called functions of the application. The code of the application is stored in one or more modules, each of which contains functions. The crash handler then identifies offsets within the module corresponding to the return addresses and identifies the functions within the module that includes those offsets. The crash handler may generate a call chain for each thread of the process and not just the victim thread. The user-mode crash reporting system then generates a crash report based on the functions in the identified call chain. Because the crash handler executes in the same process as the application, the crash handler has access to all the data of the application. Moreover, the crash handler stores the crash reports so they can be sent to a crash reporting server.

In some embodiments, the user-mode crash reporting system identifies a function of an application that is to blame for the crash of the application. The function to blame for the crash is the function that was likely executing on the victim thread at the time of the crash. The user-mode crash reporting system identifies a call chain of functions invoked at the time of the crash. The user-mode crash reporting system then accesses information identifying functions that are immune from being blamed for the crash. When a program is about to crash, the application may invoke various administrative functions in an attempt to mitigate the effects of the crash, to collect some crash-related information, and so on. These administrative functions are likely to be in the call chain but should not be blamed for the crash. These administrative and other functions that should not be blamed for a crash are designated as being immune from being blamed. The user-mode crash reporting system processes the call chain of functions to identify the last function invoked that is not immune from being blamed for the crash. The user-mode crash reporting system then designates that last function as being to blame for the crash. The information designating the functions that are immune may be specified in a configuration file and indicate the range of offsets of the functions within the module.

FIG. 1 is a block diagram that illustrates an execution environment in which applications execute in some embodiments. An execution environment 100 includes operating system components 110, an application environment 120, and application sandboxes 130. The operating system components may include a Mach layer 111, a BSD layer 112, and a core services layer 113. The Mach layer provides kernel-based services such as task and thread management, virtual memory management, interprocess communication, thread scheduling, exception handling services (e.g., Mach exceptions), and so on. The BSD layer provides higher level services such as an POSIX API, a file system implementation, a signaling mechanism (e.g., BSD signals), and so on. The core services layer provides various services such as time and date management, stream-based I/O, and so on. The application environment may provide an API for a graphical user interface, event handling, I/O services, and so on. The application environment may also provide a sandbox in which the applications execute. Each application 131 executes in its own sandbox to prevent bad behavior of one application from adversely impacting other applications or the operating system. A sandbox provides an environment in which an application has access to a tightly controlled set of resources (e.g., network access, disk space). The crash handler executes in the same sandbox as the crashed application.

Figure 2:
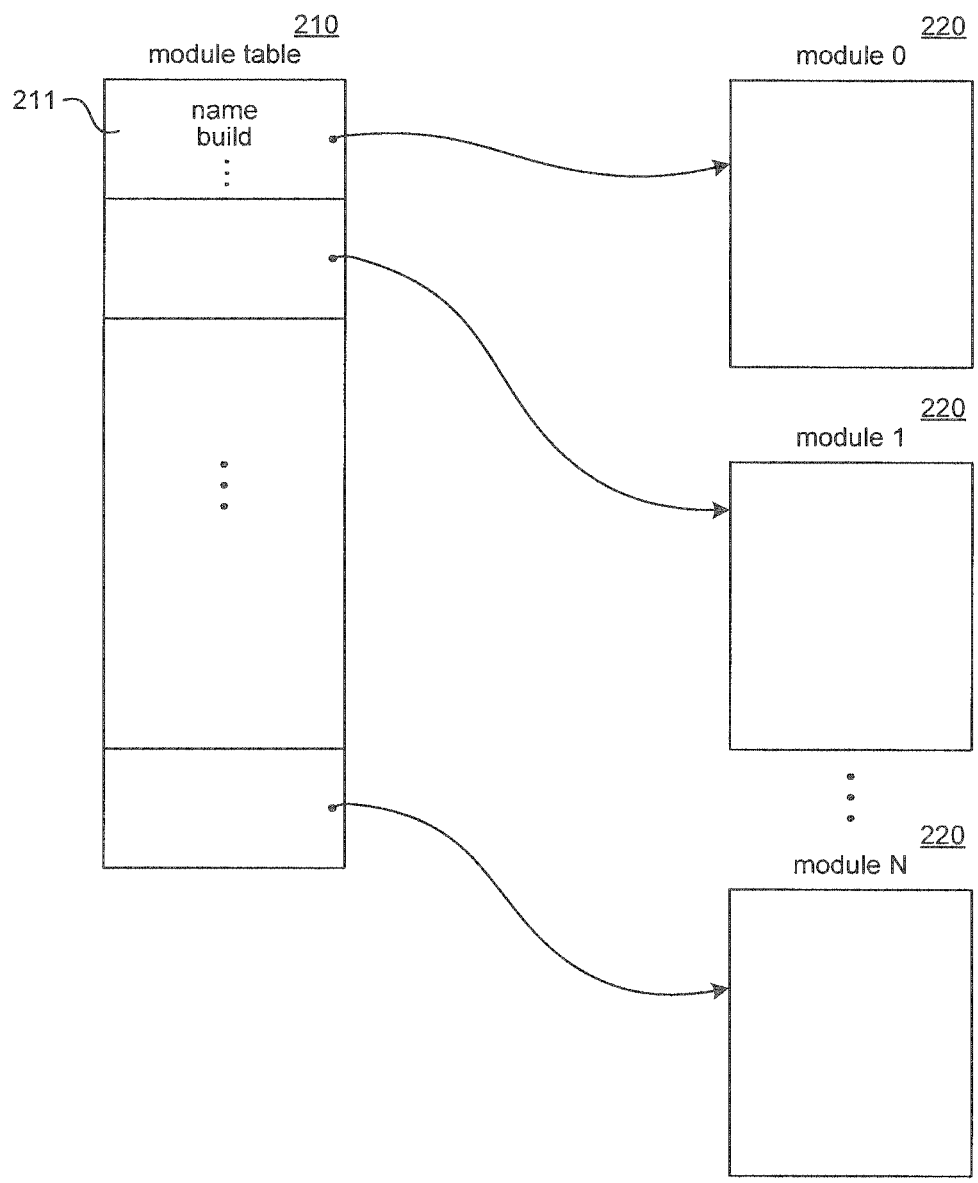
FIG. 2 is a block diagram that illustrates a module table of the user-mode crash reporting system in some embodiments.

FIG. 2 is a block diagram that illustrates a module table of the user-mode crash reporting system in some embodiments. A module table 210 maps module identifiers to the images of the modules 220 loaded into the address space of the application. Each module contains functions of the application. The module table includes an entry 211 for each module that is loaded into the process of an application. Each entry contains identification information about the module along with a reference to the loaded module. To generate the module table, the user-mode crash reporting system executing in the process of the application installs add and remove module callback components so that the system can be notified when a module is loaded into the process (i.e., address space of the process) and unloaded from the process, respectively. When a module is loaded, the add module callback is called. The add module callback is passed a reference to information about the module, including the address range into which the module is loaded, the name of the module, a unique build identifier of the module, and so on, and adds a corresponding entry to the module table. When a module is unloaded, the remove module callback is called. The remove module callback is passed a reference to the module and removes the corresponding entry from the module table.

Figure 3:
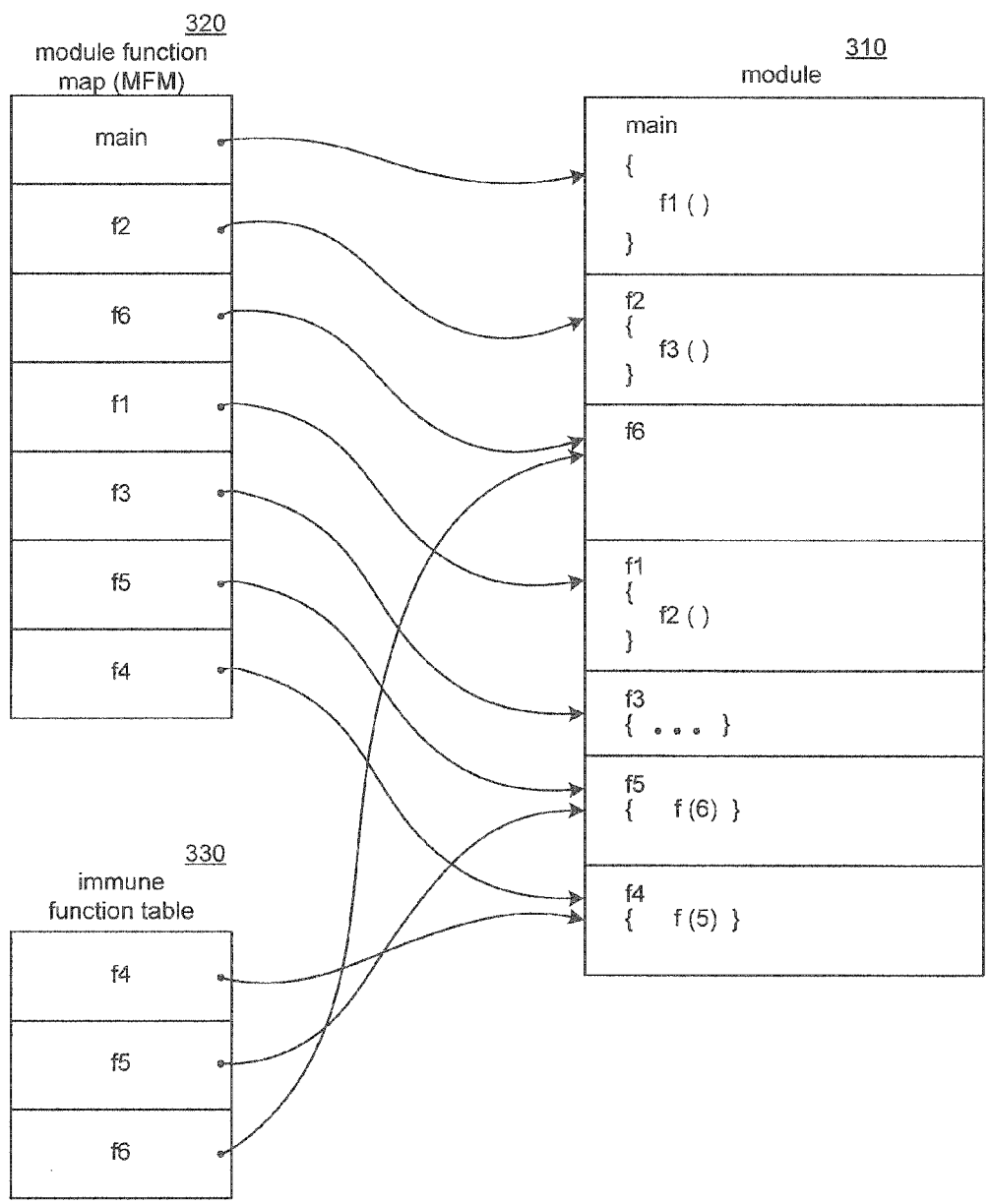
FIG. 3 is a block diagram that illustrates the layout of a module in some embodiments.

FIG. 3 is a block diagram that illustrates the layout of a module in some embodiments. A module 310 for an application includes various functions and may include a main function, which is passed control to start execution of the application. A module may also have an associated module function map 320 that contains an entry for each function of the module along with a reference to the starting point of that module in the address space of the application. A module function map may be provided along with the module, or the user-mode crash reporting system may generate the module function map based on analysis of other module-related information. The immune function table 330 identifies those functions of the module that are immune from being blamed for a crash. In this example, functions f4, f5, and f6 are immune from being blamed.

Figure 4:
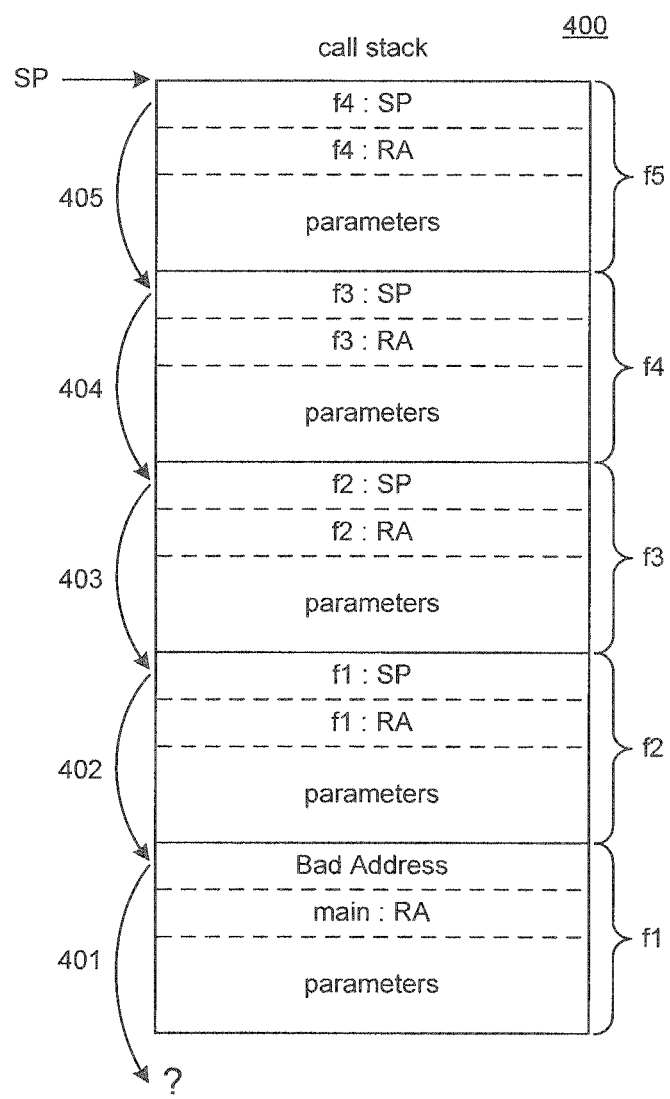
FIG. 4 is a block diagram that illustrates a layout of the call stack in some embodiments.

FIG. 4 is a block diagram that illustrates a layout of the call stack in some embodiments. As illustrated by a call stack 400, the functions f1, f2, f3, f4, and f5 of module 310 (FIG. 3) have been invoked as represented by their stack frames 401, 402, 403, 404, and 405, respectively. The stack pointer SP points to the stack frame at the top of the call stack. Each stack frame may contain a parameters area for passing parameters between the invoking function and the invoked function. Each stack frame also contains a reference SP to the stack frame of the invoking function. For example, stack frame 405 includes a reference that points to stack frame 404. The reference SP is used by a function to remove its stack frame as it returns to the invoking function. Thus, the reference SPs form a linked list of stack frames. Each stack frame also includes a reference RA to the return address within the invoking function. For example, stack frame 405 includes a return address within function f4 that is after the invocation of function f5. A reference RA is used by a returning function to return to the location after the invocation (or other location).

To generate a call chain, the crash handler of the user-mode crash reporting system walks the call stack to identify each function that has been invoked. The crash handler may be passed the thread identifier of the victim thread that was executing at the time of the crash. The crash handler may interact with the operating system to retrieve thread-related information such as the stack pointer for the thread and the instruction pointer at the time of the crash. The crash handler may use the instruction pointer to identify the function that was executing at the time of the crash (i.e., when the corresponding exception was raised) by using the module function map to identify the function corresponding to that address. To walk the call stack, the crash handler uses that stack pointer to retrieve a pointer to the next lower stack frame and the return address of the invoking function. The crash handler uses that return address to identify the function that was executing at the time of the crash by using the module function map. The crash handler continues walking the stack until it encounters the bottom of the stack. The bottom of the stack may be designated, for example, by a distinguished value (e.g., all ones) stored in the bottom frame of the call stack (e.g., reference SP==null). In some embodiments, the crash handler may walk the call stack of each thread of the process in a similar manner to generate a more comprehensive crash report.

In some embodiments, the bottom of the stack may not be readily ascertainable by the crash handler. For example, the stack frame 401 may contain a bad memory address for the reference SP, that is, where the pointer to the next lower stack frame would normally be stored. When the crash handler attempts to access memory using that bad address, a bad address exception may occur. To detect that the bottom of a call stack has been encountered, the crash handler may install a bad memory access handler that is invoked when a reference to a bad memory address is attempted. The bad memory access handler may simply set a global flag to indicate the bad memory access attempt and return to the crash handler to execute the instruction after the attempted memory access. The following instructions can check the global flag and use it as an indication that the bottom of the stack has been reached.

Figure 5:
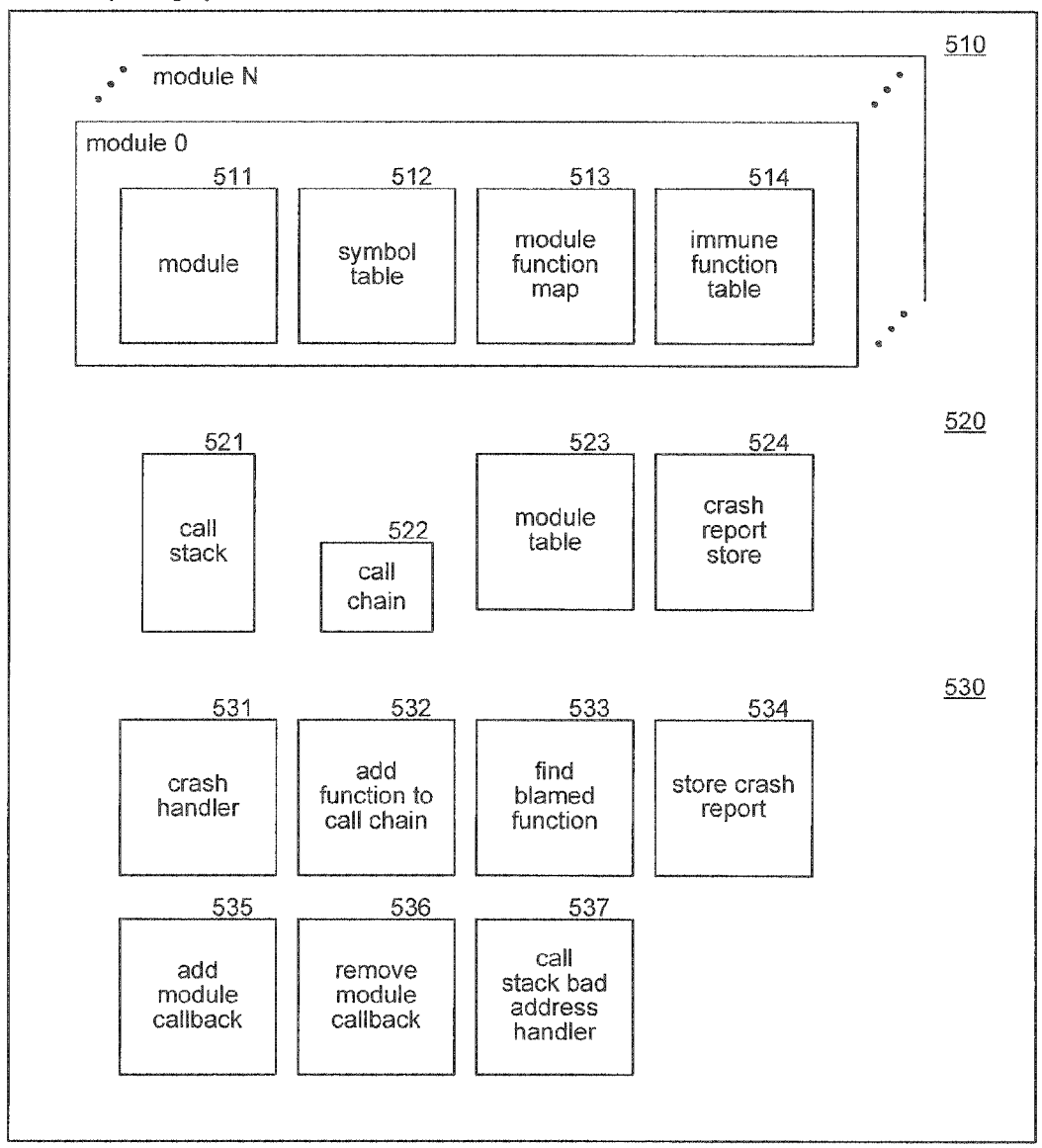
FIG. 5 is a block diagram that illustrates components of a user-mode crash reporting system in some embodiments.

FIG. 5 is a block diagram that illustrates components of a user-mode crash reporting system in some embodiments. A user crash reporting system 500 includes module data 510, data structures 520, and components 530. The module data, for each module, includes the module 511, a symbol table 512, a module function map 513, and an immune function table 514. The module data may be provided by the developer. The symbol table contains symbol-related information, which may be used to symbolicate references to functions and variables. The immune function table may be provided as configuration information stored in a configuration file of the application.

The data structures used by the user-mode crash reporting system include a call stack 521, a call chain 522, a module table 523, and a crash report store 524. In the following, the user-mode crash reporting system is described in reference to processing of the victim thread of a crash. The processing of other threads of the application that crashed would be performed in a similar manner to provide a more comprehensive crash report. The call stack represents the call stack of the victim thread. The call chain represents the chain of function calls as determined by the crash handler. The module table contains a mapping of the modules that are loaded into the address space of the application to their range of addresses. The crash report store stores the crash reports generated by the user-mode crash reporting system. The crash report store may store the crash report for each crash until it is uploaded to a crash reporting server and may persistently store other identifying information about a crash to optimize the uploading of subsequent crash reports.

The components of the user-mode crash reporting system include a crash handler 531, an add function to call chain component 532, a find blamed function component 533, a store crash report component 534, an add module callback 535, a remove module callback 536, and a call stack bad address handler 537. The crash handler, which may be installed to handle various types of crashes, walks the call stack and generates a crash report. The add function to call chain component identifies the function associated with a return address and adds an identifier of that function to the call chain. The find blamed function component identifies a function to blame for the crash. The store crash report component controls the storing of the crash report for sending to a crash reporting server when the application next executes. The add module callback and the remove module callback are installed when the application is initialized to track the modules that are loaded and unloaded. The call stack bad address handler is installed by the crash handler to handle bad address references resulting from reaching the bottom of a call stack.

The computing devices and systems on which the user-mode crash reporting system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the user-mode crash reporting system. The data transmission media is used for transmitting data via transitory, propagating signals or carrier waves (e.g., electromagnetism) via a wired or wireless connection.

The user-mode crash reporting system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the user-mode crash reporting system may be implemented in hardware using, for example, an application-specific integrated circuit ("ASIC").

Figure 6:
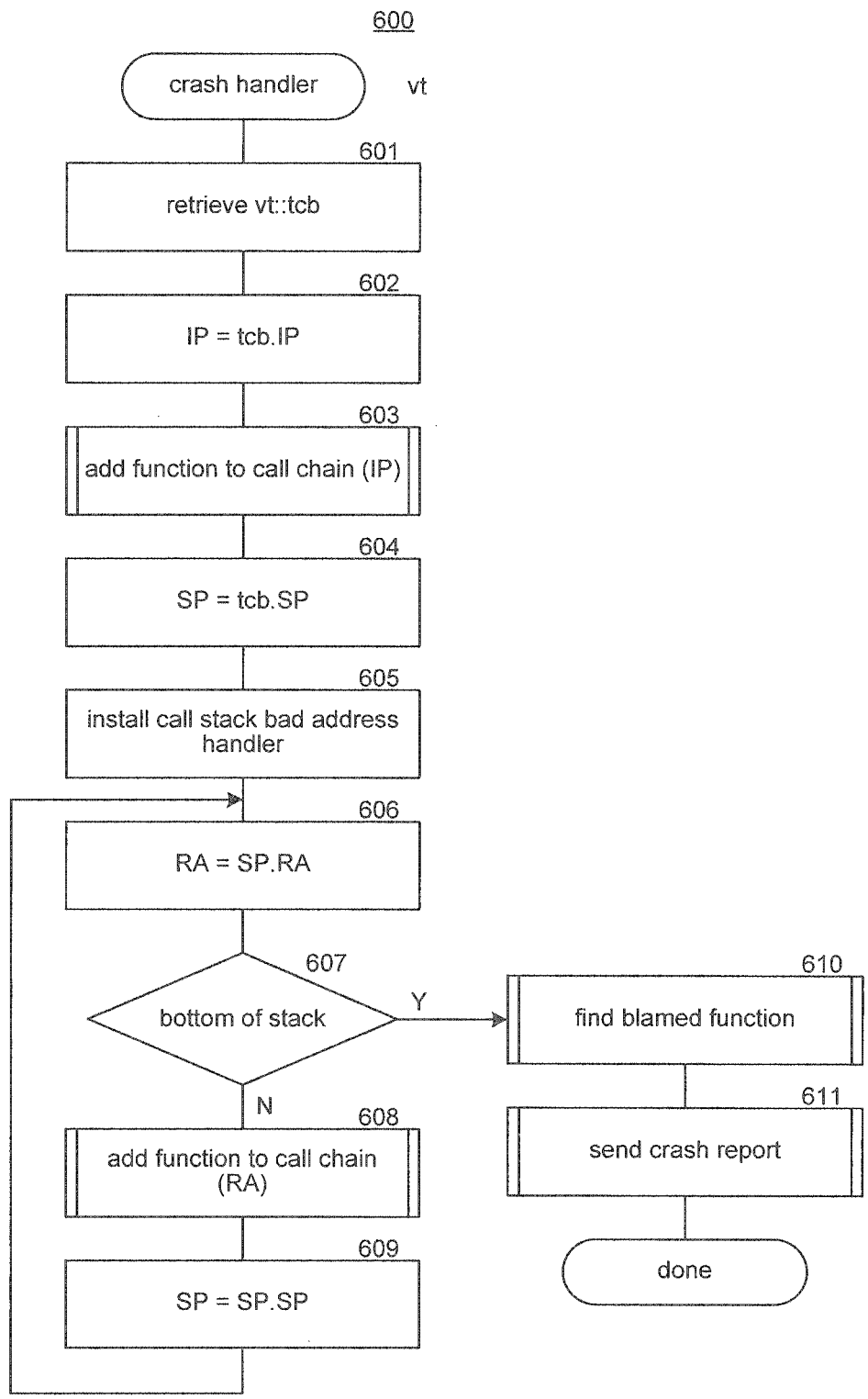
FIG. 6 is a flow diagram that illustrates the processing of a crash handler in some embodiments.

FIG. 6 is a flow diagram that illustrates the processing of a crash handler in some embodiments. A crash handler 600 is passed an indication of a victim thread, generates a call chain, finds a function to blame, and sends a crash report. In block 601, the component retrieves a thread control block or other information related to the victim thread. In block 602, the component determines the instruction pointer at the time of the crash. In block 603, the component invokes the add function to call chain component to add a function associated with the instruction pointer to the call chain. In block 604, the component retrieves the stack pointer at the time of the crash. In block 605, the component installs a call stack bad address handler to detect when a bad address is encountered when walking the call stack. In blocks 606-609, the component loops, walking the call stack. In block 606, the component retrieves the return address referenced by the current stack pointer. If the stack pointer SP points to a bad memory address, then the use of the stack pointer to access the return address will cause a bad address exception. In decision block 607, if the bottom of the stack frame has been reached (e.g., as indicated by a global flag indicating a bad address exception), then the component continues at block 610, else the component continues at block 608. In block 608, the component invokes the add function to call chain component, passing the return address. In block 609, the component retrieves a reference to the next stack frame and loops to block 606 to process the next stack frame. In block 610, the component invokes the find blamed function component to identify a function to blame for the crash. In block 611, the component invokes the store crash report component and then completes.

Figure 7:
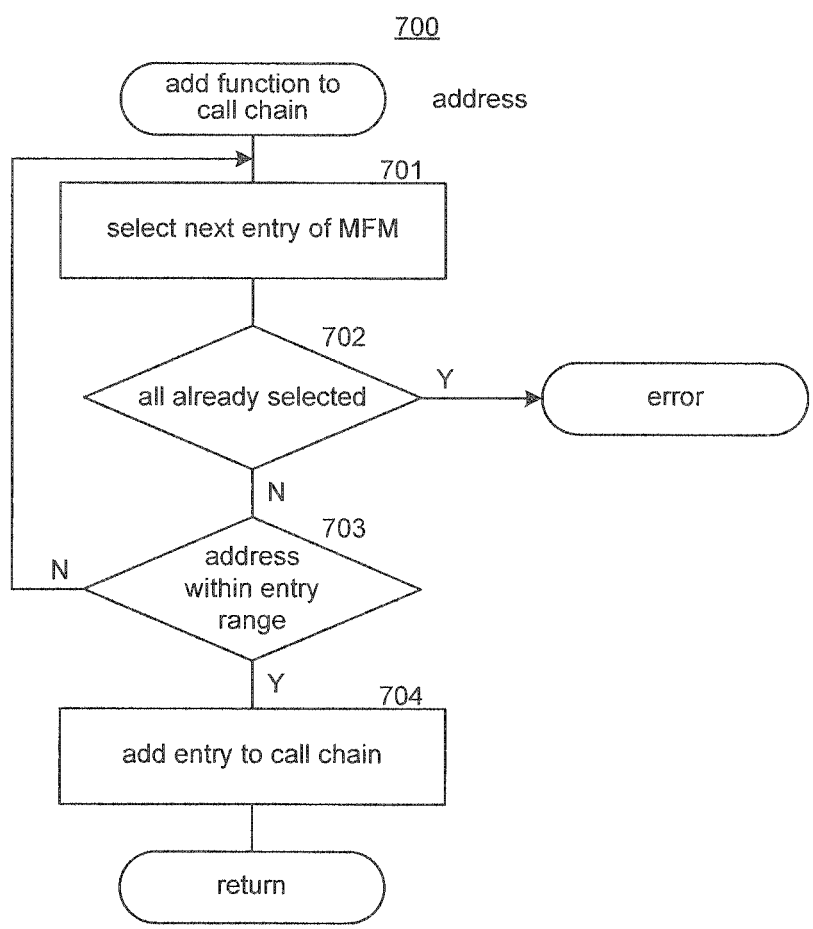
FIG. 7 is a flow diagram that illustrates the processing of an add function to call chain component of the crash reporting system in some embodiments.

FIG. 7 is a flow diagram that illustrates the processing of an add function to call chain component of the crash reporting system in some embodiments. An add function to call chain component 700 is passed an address, identifies the function within a module corresponding to that address, and adds that function to the call chain. The function may initially identify the module using the module table. In block 701, the component selects the next entry in the module function map. In decision block 702, if all the entries have already been selected, then the function corresponding to the passed address has not been found and the component reports an error, else the component continues at block 703. In decision block 703, if the address is within the range of the selected entry, then the component continues at block 704, else the component loops to block 701 to select the next entry. In block 704, the component adds an entry corresponding to the identified function to the call chain and then returns.

Figure 8:
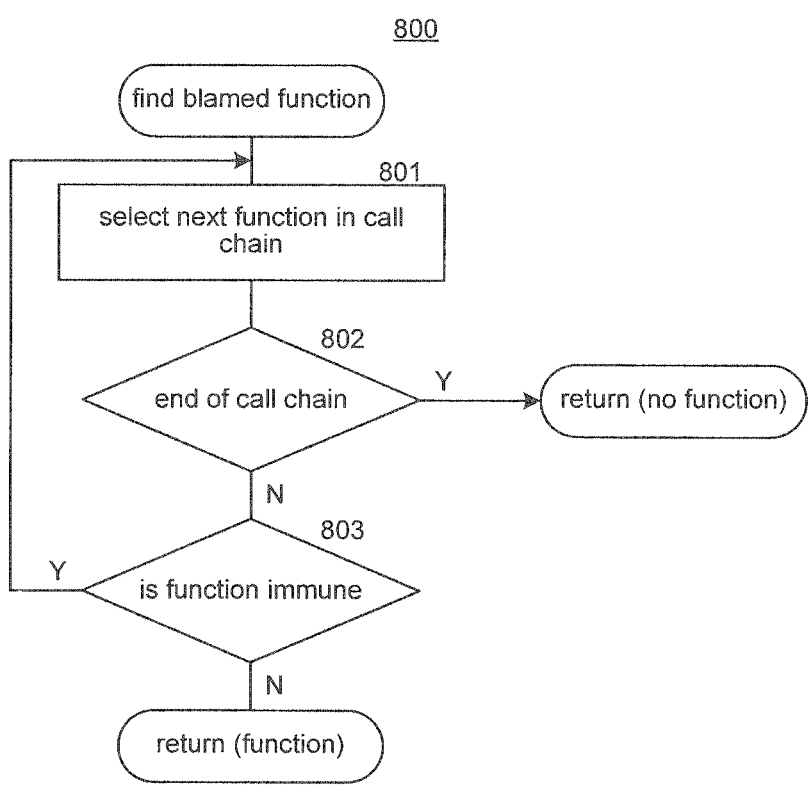
FIG. 8 is a flow diagram that illustrates the processing of a find blamed function component of the crash reporting system in some embodiments.

FIG. 8 is a flow diagram that illustrates the processing of a find blamed function component of the crash reporting system in some embodiments. A find blamed function component 800 processes the call chain to identify a function to blame for the crash that is not immune. In block 801, the component selects the next function in the call chain. In decision block 802, if the end of the call chain has been reached, then the component returns an indication that no function to blame has been identified, else the component continues at block 803. In decision block 803, if the selected function is immune as indicated by the immune function table, then the component loops to block 801 to select the next function, else the component returns an indication of the selected function to blame.

Figure 9:
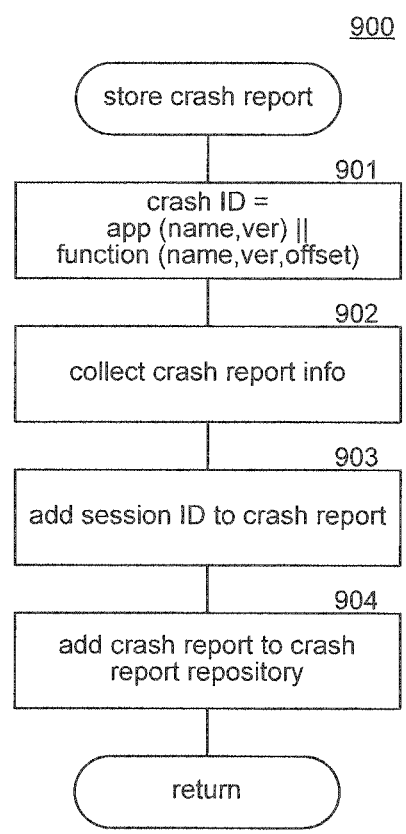
FIG. 9 is a flow diagram that illustrates the processing of a send crash report component of the user-mode crash reporting system in some embodiments.

FIG. 9 is a flow diagram that illustrates the processing of a send crash report component of the user-mode crash reporting system in some embodiments. A store crash report component 900 is invoked to send a crash report. The component may generate a crash identifier and stores the crash report for sending to a crash reporting server when the application is next launched. The component may use the crash identifier to identify whether similar crashes have been reported. In block 901, the component generates the crash identifier, for example, as a combination of the application name and its version, the blamed module name (i.e., module that contains the blamed function) and its version, and the offset of the crash within the blamed module. In block 902, the component collects various crash report information that may include the call chains of each thread, the functions to blame, symbolication of variables and function names (e.g., the function to blame), dumps of various portions of the address space of the application, and so on. In block 903, the component adds a session identifier to the crash report. The session identifier uniquely identifies an execution of an application from start to termination (e.g., crash or normal termination). In certain environments, an application (or application monitor) may report activity or other information of the application to a server, such as a customer experience server, and identify the activity by a session identifier. The use of the session identifier in the crash report allows the activity information to be correlated to the crash report. In this way, a developer may be able to take advantage of having both the crash report and the activity information when analyzing the cause of the crash. In block 904, the component adds the crash report to the crash report repository and then returns. When the application next executes, if an upload criterion is satisfied, the application uploads the crash report to the crash report server. The application may use various upload criteria to determine whether a crash report should be uploaded. For example, the upload criteria may be based on the current communication bandwidth (e.g., cellular versus Wi-Fi), whether a certain number of the same type of crash reports have already been uploaded, and so on.

Figure 10:
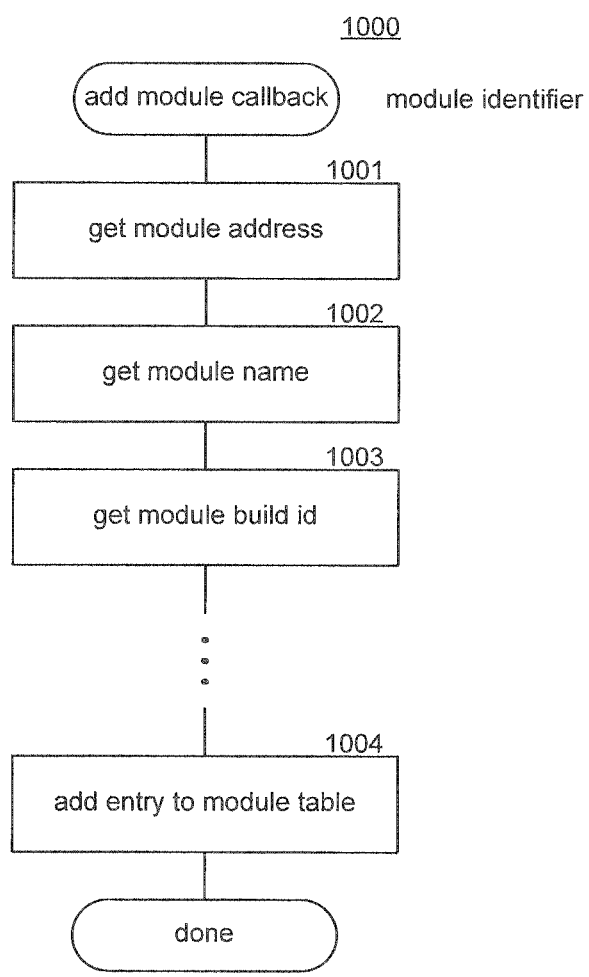
FIG. 10 is a flow diagram that illustrates the processing of an add module callback component of the user-mode crash reporting system in some embodiments.

FIG. 10 is a flow diagram that illustrates the processing of an add module callback component of the user-mode crash reporting system in some embodiments. An add module callback component 1000 is installed when the user-mode crash reporting system initializes and records those modules whose images have been loaded into the address space of the application. The application environment may invoke the add module callback passing an indication of a module identifier to notify the application that a module has been loaded. In blocks 1001-1003, the component may retrieve various information about the module that has been loaded, such as its address in memory, its name, its build identifier, and so on. In block 1004, the component adds an entry to the module table and then completes.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-readable storage medium storing computer-executable instructions for controlling a computing device to generate a crash report when an application crashes, the application being organized as a module with functions, the computer-executable instructions comprising instructions that:

install a crash handler to execute in the same process as the application when the application crashes; and under control of the crash handler executing in the process of the application after the application crashes, identify a victim thread of the process that was executing at the time of a crash;

walk a call stack of the victim thread to identify return addresses for returning from called functions of the application;

identify offsets within the module corresponding to the return addresses;

identify a call chain of functions using the identified offsets; and create a crash report based on the identified call chain.

2. The computer-readable storage medium of claim 1 wherein the computing device is executing under control of an iOS-based operating system.

3. The computer-readable storage medium of claim 1 wherein the application and the crash handler execute in a user privilege mode within the process.

4. The computer-readable storage medium of claim 1 wherein the computing device is executing under control of an operating system with a Mach-based kernel and a BSD-based kernel and multiple crash handlers are installed to handle Mach exceptions and BSD signals generated when the application crashes.

5. The computer-readable storage medium of claim 1 wherein an identification of the victim thread is provided to the crash handler when control is transferred to the crash handler.

6. The computer-readable storage medium of claim 1 wherein the application executes in a sandbox environment.

7. The computer-readable storage medium of claim 1 wherein the computer-executable instructions further comprise instructions that identify a function to blame for the crash based on analysis of the call chain.

8. The computer-readable storage medium of claim 7 wherein a function that is designated as immune is excluded from being blamed for a crash.

9. The computer-readable storage medium of claim 8 wherein functions are identified as being immune in a configuration file.

10. The computer-readable storage medium of claim 1 wherein the crash report includes a session identification to map the crash report to activity information identified by the session identification, the activity information being logged during execution of the application.

11. The computer-readable storage medium of claim 1 wherein the computer-executable instructions further include instructions that send the crash report to a crash report server when an upload criterion is satisfied.

12. A computing system for generating a crash report when an application executing in a sandbox environment crashes, the application being organized as a module with functions, the computing system comprising:
 a computer-readable storage medium storing computer-executable instructions of:
  the module; and
  a crash handler for executing in the same process as the application when the application crashes, the crash handler comprising:
   a component that identifies a victim thread of the process, the victim thread being a thread of the process that was executing at the time of a crash;
   a component that retrieves a stack pointer to a call stack of the victim thread and retrieves an instruction pointer to an instruction executing at the time of the crash;
   a component that walks the call stack of the victim thread to identify return addresses for called functions, the return addresses indicating a return location within a calling function;
   a component that identifies offsets within the module corresponding to the return addresses and the instruction pointer;
   a component that identifies a call chain of functions using the identified offsets;
   a component that identifies a function to blame for the crash, the function to blame for the crash being the last function called before the crash that is not immune from being blamed for a crash as indicated by an immune function table;
   a component that creates a crash report that identifies the function to blame for the crash and a session identification of an application activity log for the execution of the application; and
   a component that, when an upload criterion is satisfied, uploads the crash report to a crash report server; and
 a processor that executes the computer-executable instructions stored in the computer-readable storage medium.

13. The computing system of claim 12 wherein the crash handler further comprises a component that identifies a name of the function to blame using symbol table information associated with the application.

14. The computing system of claim 12 wherein the computing system is executing under control of an operating system with a Mach-based kernel and a BSD-based kernel and multiple crash handlers are installed to handle one or more Mach exceptions and BSD signals generated when the application crashes.

15. The computing system of claim 12 wherein the component that identifies a call chain of functions identifies functions corresponding to the identified functions and adds an indication of the identified functions to the call chain and wherein the computer-executable instructions further include a component that adds administrative functions to the immune function table.

* * * * *